Dec. 13, 1938.  C. H. KINGHAM  2,140,264
RETRACTABLE LANDING GEAR
Filed Sept. 27, 1935  3 Sheets-Sheet 1
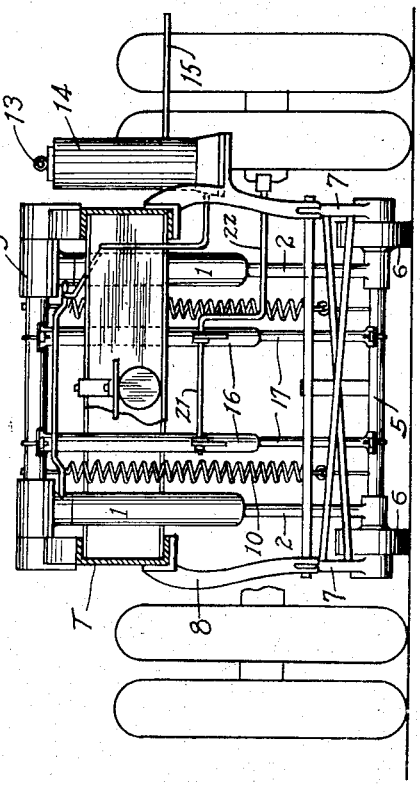
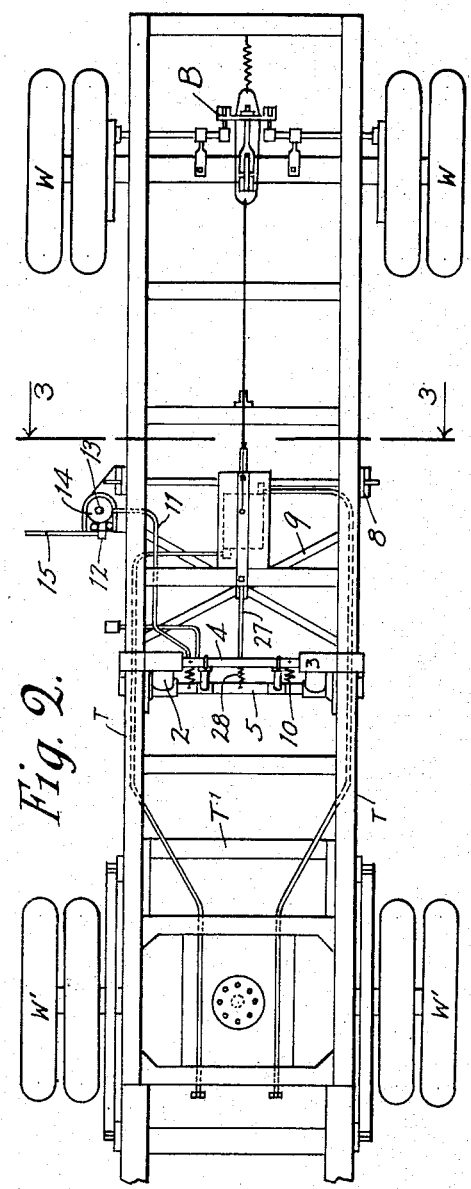
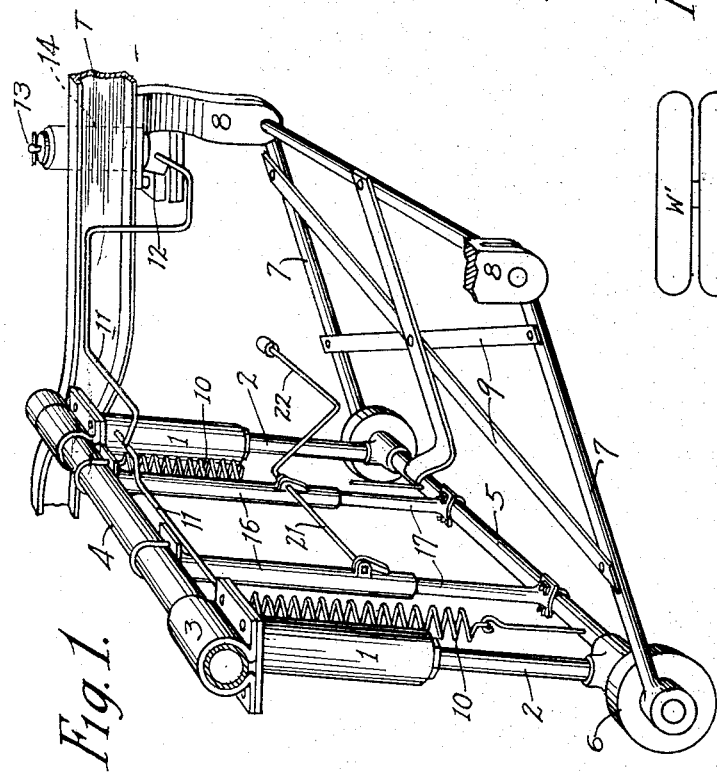
Inventor
Charles H. Kingham
By Arthur J. Robert
Attorney Dec. 13, 1938.  C. H. KINGHAM  2,140,264
RETRACTABLE LANDING GEAR
Filed Sept. 27, 1935  3 Sheets-Sheet 2
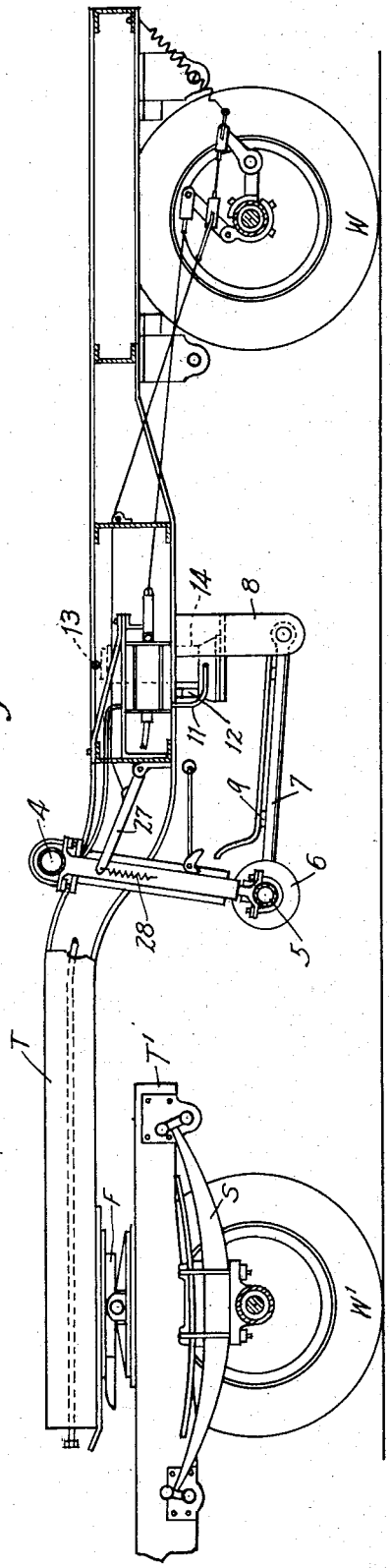
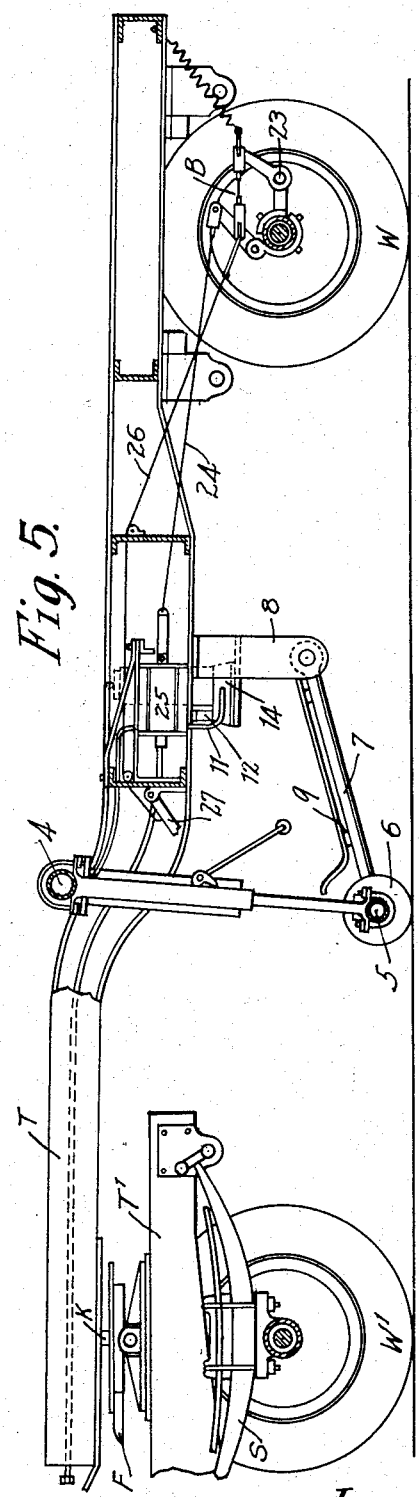
Inventor
Charles H. Kingham
By Arthur J. Robert
Attorney Dec. 13, 1938.   C. H. KINGHAM   2,140,264
RETRACTABLE LANDING GEAR
Filed Sept. 27, 1935   3 Sheets-Sheet 3
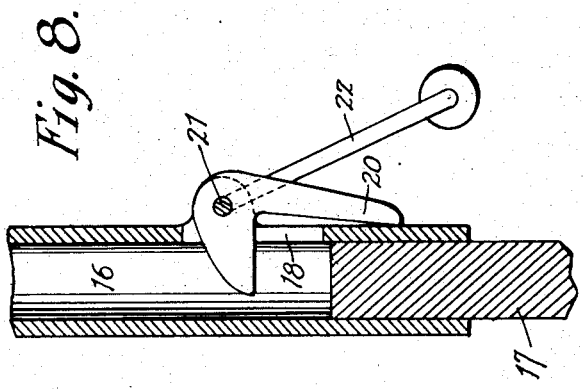
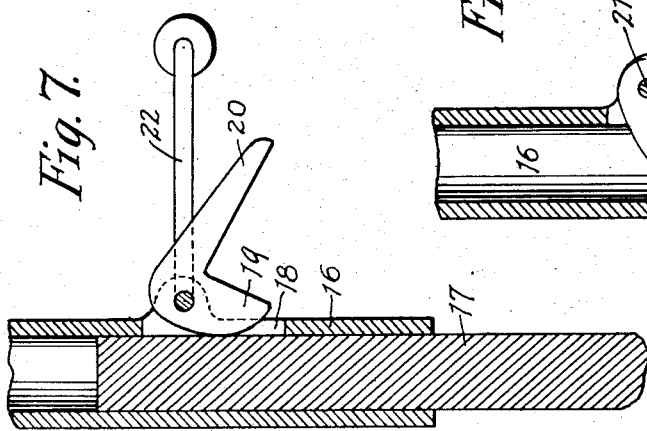
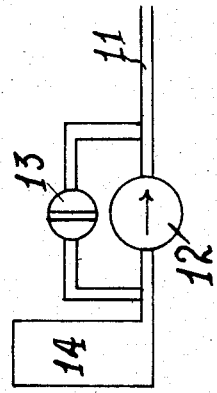
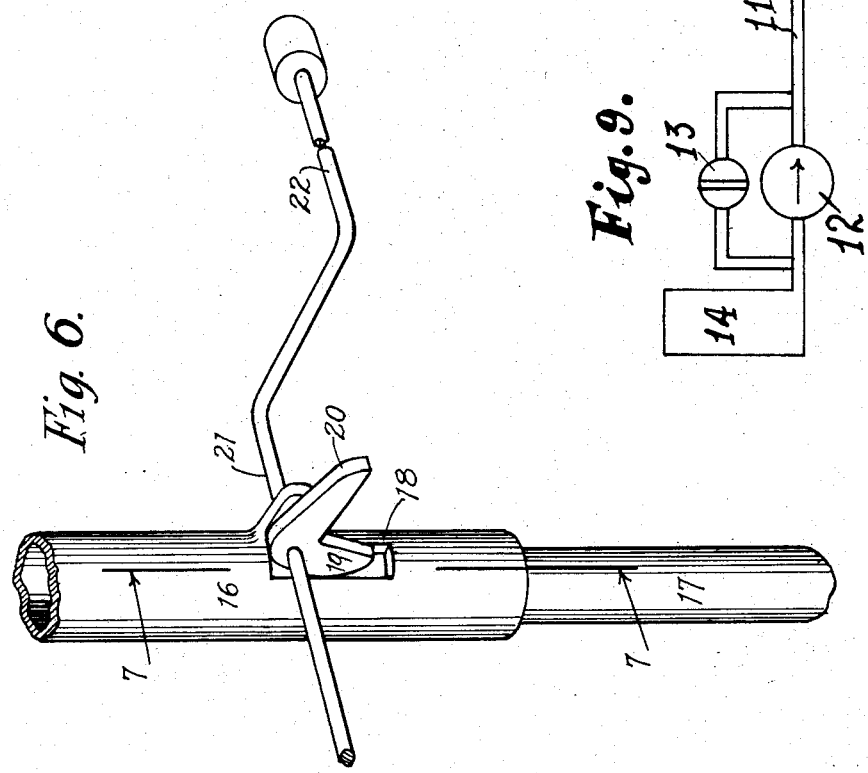
Inventor
Charles H. Kingham
By Arthur J. Robert
Attorney Patented Dec. 13, 1938

2,140,264

UNITED STATES PATENT OFFICE 2,140,264

RETRACTABLE LANDING GEAR

Charles H. Kingham, Louisville, Ky.

Application September 27, 1935, Serial No. 42,484

3 Claims. (Cl. 254—86)

When a semi-trailer is connected to a tractor or truck, its front end is supported by the tractor. In order to support such end when the tractor is disconnected from the trailer, the latter is provided with a retractable landing gear which may be lowered into contact with the ground, as desired. At the present time, most, if not all, of the landing gear in use includes a pair of wheels mounted at one of the ends of a pair of legs, the other ends of which are pivotally secured to opposite sides of the trailer. The legs are connected to a hand operated screw mechanism by means of which they may be manually swung about their pivots to move the wheels arcuately into and out of engagement with the ground.

With this type of structure, it is not practical to adjust the trailer landing gear legs to a length such that their wheels will, by engaging the ground before the end of their downward arcuate movement, begin to elevate the trailer, as their downward movement is continued and thus ultimately remove the load from the tractor. It is, therefore, necessary to adjust the legs to a length such that the wheels will barely touch the ground when swung to the load-supporting position. Since it is also impractical to lengthen the legs in the load-supporting position in order to remove the load, the practice universally followed is to effect its removal simply by pulling the tractor from under the trailer. When this is done, the load supporting springs of the tractor raise its connecting level above the connecting level of the trailer. Now, in order to reconnect trailer and tractor, the latter is moved backwardly and its chassis depressed to the proper level by bumping the front end of the trailer with the rearwardly inclined fifth wheel of the tractor, an operation sometimes complicated and even prevented by the sinking of the landing gear wheels into the ground.

The foregoing structure is objectionable because of the inconvenience and delay occasioned by its laborious and slow operation to and from the load supporting position, by the necessity of adjusting the length of the legs for each tractor of different height with which the trailer is used, and by the necessity of manually jacking the trailer upwardly when the wheels sink into the ground sufficiently to prevent reconnection in the manner described. It is further objectionable because the shock produced, during the connecting and disconnecting operations, subjects to damage the tractor and trailer parts and the load carried by the trailer. It has been proposed to overcome these objections to some extent by the use of fluid power-operated means for arcuately swinging the legs against the load, but even this type of landing gear, if feasible, has the objection of being extremely limited in its range of vertical movement and not adjustable, under load, to a new range. It has also been proposed to provide landing gear in the form of screw jacks, but such gear is utterly impractical because the jacks are extremely laborious to operate and slow in operation. Furthermore, where the use of two or more simultaneously operable jacks is desired, the resulting structure is of a highly complicated and expensive nature. The present invention is directed to a landing gear structure which avoids these objections.

The principal objects of this invention are to provide a landing gear which can be easily and quickly moved, under load, throughout a range of vertical movement sufficient, even when the landing gear wheels have sunk into the ground, to elevate the front end of the trailer above any tractor chassis now in common use, and, to provide one which is not only simple and inexpensive both to construct and install, but easy to operate.

Generally stated, the invention consists in providing a landing gear in the form of a simple hydraulic jack and in arranging such jack on a trailer for substantially vertical extension into and retraction out of trailer supporting position. With a landing gear of this character, I have found that the trailer can be easily and quickly raised or lowered within a range of heights amply sufficient to avoid all of the objections heretofore mentioned. In fact, with this arrangement, it is even possible, by leaving the tractor and trailer connected together, to raise the rear wheels of the tractor from the ground sufficiently to permit the changing of tires and the installation or removal of chains and to facilitate the insertion of material under mired wheels to effect their release.

Another object is to provide means for preventing the accidental retraction of the landing gear from load supporting position.

A further object is to provide a simple and inexpensive retraction blocking mechanism which operates automatically, upon the extension of the landing gear, to block its retraction, and which may be easily and quickly removed manually from locking position when retraction of the landing gear is desired.

The invention is illustrated in the accompanying drawings, wherein:—

Figure 1 is a partly broken perspective of a landing gear constructed in accordance with my invention;

Figure 2 is a plan view of a trailer chassis to which the landing gear is applied;

Figure 3 is partly broken section taken along line 3—3 of Figure 2;

Figures 4 and 5 are partly broken side elevations of the chassis showing the landing gear respectively in retracted and extending positions;

Figure 6 is a fragmentary perspective of the retraction blocking mechanism;

Figures 7 and 8 are fragmentary sections showing the retraction blocking mechanism respectively in non-blocking and blocking position; and Figure 9 is a schematic diagram of the connections between the reservoir, pump, and valve.

The invention, as illustrated in the drawings, is embodied in the chassis of a conventional semi-trailer T having its rear end supported on spring-mounted wheels W and its front end adapted for support on the rear end of tractor T', and for connection thereto through the usual form of trailer king pin K (see Figure 5) and tractor fifth wheel F. The rear end of the tractor is, of course, supported in the usual manner as by the springs S and wheels W'.

In accordance with the present invention, the trailer is provided with a retractable supporting mechanism or landing gear consisting of hydraulic jacking means secured to the trailer in position for substantially vertical extension into and retraction out of the trailer supporting position. As shown, such means includes a pair of hydraulic jacks each having an upper stationary cylinder 1 and a lower movable ram 2 which cooperates to define a fluid pressure chamber (not shown) into which a suitable fluid may be admitted under pressure, to effect the extension of the jacks. Inasmuch as various well known types of hydraulic jacks may be readily adapted for use of this character, no detailed description of the specific structure herein contemplated is deemed necessary.

The top of each cylinder 1 is secured to the vehicle in any suitable manner, preferably through suitable brackets 3 to an upper shaft 4, the ends of which are suitably secured to opposite sides, and toward the front end, of the trailer chassis T. The securement of the tops of cylinders 1 may be such as to hold the jacks rigidly in substantially vertical depending relation to the chassis, but it preferably is such as to permit some swinging movement of the jacks, this being accomplished by pivotally mounting either the jacks to the upper shaft 4 or the upper shaft to the trailer, or both. The projecting ends of the lower rams 2 carry a lower reenforcing bar or shaft 5 upon which the ground engaging wheels 6 of the landing gear are rotatably mounted. In order to support the lower rams against lateral thrust, and guide them in their vertical movement, the opposite ends of the lower shaft 5 are respectively connected to corresponding ends of a pair of radius rods 7, which are pivotally secured, at their other ends, to opposed brackets 8 on opposite sides of the trailer. The radius rod connections will, of course, cause the wheels 6 to travel in an arcuate path. In order to secure the maximum range of vertical movement for the wheels 6, the radius rods should be both centered and made of a length such that the arc of travel will be substantially vertical, thus reducing the horizontal movement to a minimum.

For example, I have found the range of vertical travel to be entirely satisfactory when the radius rods are not only made of a length slightly greater than the diameter of the largest size of tire, which may be used on the trailer or any of its tractors, but centered at a point adjacent or below the horizontal plane of the lower shaft 5 in its retracted position. An arrangement of this general character is advantageous inasmuch as the radius rods, when provided with and connected to crossed reenforcing members 9, afford a convenient and accessible support for a spare tire.

While the jacks may be both extended and retracted by suitably applied fluid pressure, a more simple, less expensive but otherwise equally satisfactory arrangement is preferred wherein fluid pressure is used to extend the jacks against the action of suitable springs and the latter used to retract the jacks and hold them in the retracted position when the fluid pressure is released. The landing gear is, therefore, provided with retracting springs 10 which are connected to the trailer through upper shaft 4 and to the lower rams through lower shaft 5. Any suitable fluid, preferably a liquid such as oil, furnished from any suitable source located on the trailer or tractor, may be utilized. In the embodiment shown, the pressure chamber of each jack is connected through a wall of the cylinder 1 to an oil pipe 11 which extends along the chassis of the trailer to the base of a pumping unit. The pumping unit may be conveniently mounted on an outward extension of one of the radius rod brackets 8, this unit being composed of a pump 12 and an oil reservoir 14. The oil pipe 11 is separately connected through the pump 12 to the reservoir 14 and through the valve 13 to the reservoir 14, whereby oil may be pumped from the reservoir through the pipe 11 into the jacks, when the valve is closed, and returned from the jacks to the reservoir, when the valve is opened. The pump may be operated by any suitable means, but preferably is arranged for manual operation by means of a detachable handle 15. Since pumping units suitable for this class of work are well-known and easily obtained, a more detailed description of its structure and operation is not deemed necessary. It may, therefore, suffice to say that pumps of this general character require but little effort in operation, even when used to lift the maximum load of the trailer, that they can be operated to lift such load through their full range of movement in a comparatively short time and to lower it in less time or at any slower rate that may be desired.

While the operation of the landing gear will be understood from the foregoing, it may be helpful to explain the disconnecting and reconnecting operations starting with the trailer and tractor connected as shown in Figure 3. The reservoir valve 13 is first closed and the handle 15 operated to pump oil into the jacks. This causes the lower rams 2 to move downward against the action of springs 10 until the wheels 6 engage the ground whereupon the downward movement of the rams ends and the upward movement of the trailer begins. This operation should be continued until the load is completely removed from the tractor. Such a condition is illustrated in Figure 5 wherein it will be noted that the king pin K is exposed and that the tractor springs S have moved to what may be termed the no-load position. Further elevation will cause the tractor to be elevated; hence, is not desirable except when a rear tire on the tractor is to be changed or some other operation performed which requires such lifting of the tractor. Now, upon releasing the mechanism (not shown), which locks the pin K to the fifth wheel F, the tractor may be removed from and returned to the trailer without jarring either tractor or trailer in any way.

In the reconnecting operation, should it be required to elevate the trailer additionally to conform to the higher chassis height of another tractor or to compensate for the sinking of the wheels 6 into the ground, it is only necessary to pump more oil into the jacks and thereby lift the trailer to the greater height desired, an operation requiring a negligible amount of effort or time. With the tractor in the connecting position, the trailer can be lowered simply by opening the valve 13. With this valve open, the oil in the jacks is forced to return to the reservoir 14, under the pressure of the load and the pull of the springs 10 until the full weight of the trailer rests on the tractor. From that point, the springs 10 alone continue to retract the lower rams 2 and to force the return of oil to the reservoir until the landing gear is completely retracted. It will be understood that the rate at which the trailer is lowered can be controlled and stopped at any time by appropriately operating the valve.

If the trailer is loaded or unloaded in such manner as to throw all or a substantial part of the load on one side of the landing gear, it is possible that a flow of oil will be forced from the one jack, which bears the greater part of the load, to the other. When this occurs, one jack will be retracted and the other extended, thus twisting the landing gear and trailer, tilting the front end of the trailer and possibly overturning it. To avoid such occurrences, a unit arranged to prevent the accidental retraction of either or both landing gear jacks is provided at each side of the landing gear.

Each unit includes a stationary guide member 16 preferably in the form of a cylinder and a movable member 17 preferably in the form of a plunger which is slidably fitted to the bore of the cylinder. The opposite ends of the unit are respectively secured to the upper stationary shaft 4 and lower movable shaft 5 of the landing gear, so that the cylinder remains stationary while the plunger moves with the landing gear. The cylinder of each unit has an opening or slot 18 so located as to be slightly beyond the inner end of the plunger 17 when the landing gear is extended into the load supporting position. Now, in order to block retraction of the landing gear from such position, each unit is provided with a blocking element or pawl 19, arranged for movement through the slot 18 to blocking position across the retraction path of the plunger where further movement in the same direction is prevented by the engagement of the blocking elements extension or stop 20 with the cylinder 16. While the blocking elements 19 may be separately mounted and operated, they preferably are connected for simultaneous operation. Accordingly both are fixedly secured to a rod 21 extending horizontally from one element to the other. This rod is rotationally carried by suitable lugs on the cylinders of the blocking elements but it may be rotationally mounted on the trailer in any other suitable manner. Also, it may be manually operated in both directions of movement but its blocking movement is preferably accomplished automatically. To produce automatic operation of the elements into the blocking position, one end of the rod is bent outwardly to form an off-set handle 22, the weight of which yieldingly urges the rod in the direction necessary to move the element into blocking position.

With the landing gear retracted, the blocking element is yieldingly held against one side of the plunger. This element remains in such position during the extension of the landing gear up to the load supporting position. As the gear moves into the load supporting position, the inner end of the plunger moves beyond the element, whereupon the weight of the handle 22 becomes effective to turn the rod 21 and thus swing the element into its blocking position across the retraction path of the plunger. With the element in blocking position, it is evident that accidental retraction of either or both of the landing gear jacks is limited to the points where such elements engage their respective plungers. When complete retraction of the landing gear is desired, it is simply necessary to raise the handle 22 sufficiently to remove the element from the retraction path of the plunger and then open valve 13. However, if the plunger has been retracted accidentally or otherwise into engagement with the element, it will be necessary first, to extend the gear sufficiently to permit removal of the element before opening the valve. Of course, it will be appreciated that the blocking mechanism not only prevents the retraction of the landing gear under unbalanced load conditions, but also under other conditions such as loss of pressure, in the hydraulic system, through leakage.

In the construction illustrated, the trailer rear wheels W are provided with brakes having an operating shaft 23. This shaft may be turned to apply the brakes through the agency of the braking mechanism designated generally by the letter "B", the connecting link 24 and brake operating cylinder 25. The brake operating mechanism B is also connected through link 26, arm 27 and spring 28, to the landing gear, in a manner such as to apply and release the brakes automatically as the landing gear is extended and retracted. Since the brake operating mechanism forms no part of the present invention, a detailed description of its structure and operation is not deemed necessary. This application is a continuation in part of the application filed by me on October 27, 1934, bearing Serial No. 750,294.

Having described my invention, I claim:—

1. A retractable landing gear for trailers and the like comprising a pair of laterally spaced longitudinally extensible and retractable legs in the form of hydraulic jacks, each leg having its cylinder pivotally securable to a trailer and its ram slidably secured to said cylinder, means for holding the legs in position for substantially vertical extension into and retraction out of trailer supporting position, tension springs resiliently holding said rams in the retracted position, said springs extending outside of said jacks with their opposite ends respectively connected to the rams and securable to the trailer, a pump for pumping a fluid into said jacks to extend the rams, a normally closed manually operable valve, adapted when opened to release the fluid pressure of said jacks to permit the retraction of said rams and means automatically operable upon the extension of said jacks to block their retraction, said means being manually operable out of the retraction blocking position from a point adjacent said valve, whereby said valve and blocking means may be operated simultaneously by the same operator.

2. A retractable landing gear for trailers and the like comprising: a longitudinally extensible and retractable leg embodying the ram and cylinder parts of a hydraulic jack, the cylinder part being pivotably connected to a trailer; radius rod means pivotally connected adjacent one end to the trailer and adjacent its other end to the ram to guide the latter along a substantially vertical path during the extension and retraction of the leg into and out of trailer supporting position; and means for extending and retracting the leg.

3. A retractable landing gear for trailers and the like comprising: a pair of longitudinally extensible and retractable legs, each embodying the ram and cylinder parts of a hydraulic jack, the legs being horizontally spaced with their cylinder parts pivotally connected to a trailer to depend therefrom; radius rod means pivotally connected adjacent one end to the trailer and adjacent the other end to the lower portions of the ram parts to guide the latter along a substantially vertical path during the extension and retraction of the legs into and out of trailer supporting position; and means for extending and retracting the legs simultaneously.

CHARLES H. KINGHAM.